O. S. STRICKLAND AND G. W. WOOD.
AUTOMOBILE SAFETY CRANK.
APPLICATION FILED AUG. 19, 1920.
1,379,320. Patented May 24, 1921.
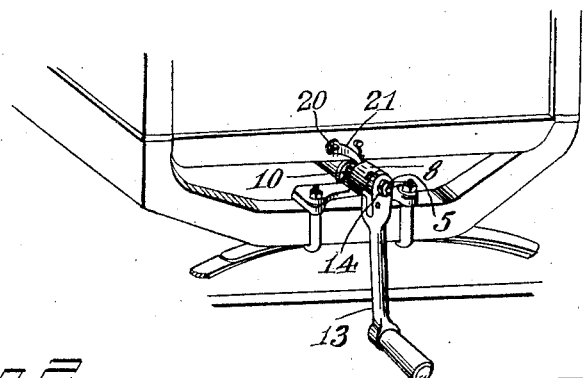
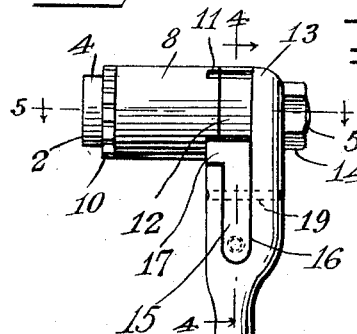
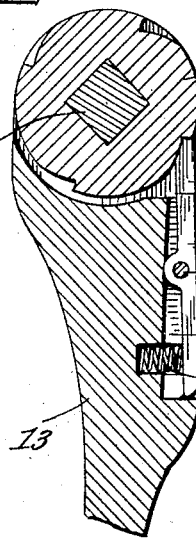
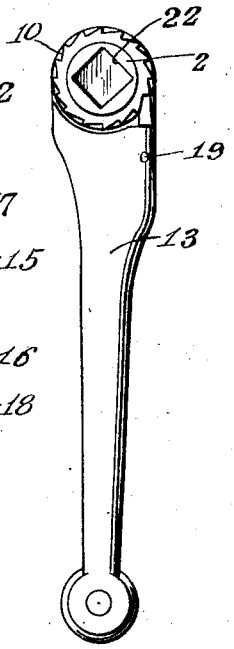
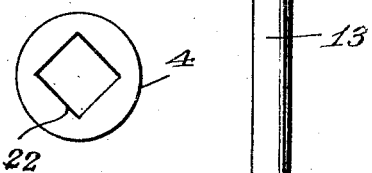
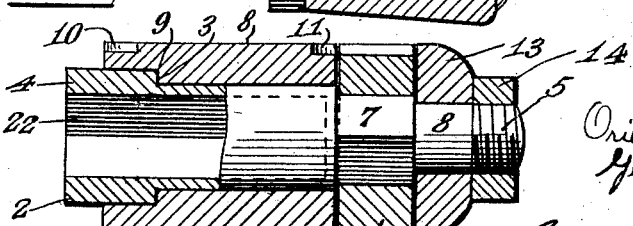

UNITED STATES PATENT OFFICE.

ORIEN S. STRICKLAND AND GEORGE WILLIAM WOOD, OF PORTALES, NEW MEXICO.

AUTOMOBILE SAFETY-CRANK.

1,379,320.   Specification of Letters Patent.   Patented May 24, 1921.

Application filed August 19, 1920. Serial No. 404,705.

*To all whom it may concern:*

Be it known that we, ORIEN S. STRICKLAND and GEORGE W. WOOD, citizens of the United States, residents of Portales, in the county of Roosevelt and State of New Mexico, have made a certain new and useful Invention in Automobile Safety-Cranks; and we do declare the following to be a full, clear, and exact description of the same, such as will enable others skilled in the art to which it appertains to make and use the invention, reference being had to the accompanying drawings, and to letters or figures of reference marked thereon, which form a part of this specification.

The invention relates to a safety crank device for automobiles, and it consists in the novel construction and combinations of parts, as hereinafter set forth.

In the accompanying drawings illustrating the invention, Figure 1 is a perspective view of the invention, as applied; Fig. 2 is a side view of the invention; Fig. 3 is an end view of the same; Fig. 4 is a section on the line 4—4, Fig. 2; Fig. 5 is a section on the line 5—5, Fig. 2, and Fig. 6 is a detail end view of the stub shaft.

In these drawings, the numeral 2 designates a stub shaft, the inner end portion of which is cylindrical and provided with an annular shoulder 3 and an enlarged end 4, the outer end portion of said shaft being threaded at its extreme end at 5, having a rounded portion 6 adjacent to its extreme end, and a squared portion 7, between the rounded portion 6 and the rounded portion 2, the portion 6 being of the same diameter as the threaded end 5.

Fitting and revoluble upon the stub shaft is a sleeve 8, having a shoulder 9, abutting against the shoulder 3, a series of ratchet teeth 10 at its inner end, and a series of ratchet teeth 11, at its outer end. Fitting upon the squared portion 7 of the stub shaft is a ratchet wheel 12 having peripheral ratchet teeth and a squared aperture engaging closely said part 7, the ratchet teeth of said wheel being similar in number and capable of alinement with the ratchet teeth 11 of the aforesaid sleeve, which is of the same diameter as that of said ratchet wheel.

Fitting upon the rounded portion 6 of the stub shaft is a crank arm 13, a nut 14 being threaded on the end of the stub shaft to secure said crank arm in place.

The inner end of the crank arm is enlarged and provided with a pawl 15 pivoted within a recess 16 thereof and normally located entirely within the same in protected position, said pawl normally engaging the teeth of the ratchet wheel 12 and having a laterally extended free end 17, normally also engaging the teeth 11 of said sleeve, under the influence of the spring 18 seated in the crank arm and bearing against the tail arm of said pawl, which is pivoted intermediately of its length at 19. Pivoted to the radiator of the car at 20, is a pawl 21, normally engaging the teeth 10 of the said sleeve.

In the use of this invention, the old crank shaft of the car is cut off, and the remaining squared stub fitted into the squared seat 22 at the inner end of the stub shaft 2, being either riveted within said seat or merely loosely fitted therein.

In the operation of the invention, upon rotation of the crank in cranking the engine, the stub shaft 2, the sleeve 8, and the ratchet wheel 12 all rotate therewith clockwise. Should the engine backfire, the parts 2, 8, and 12 would attempt to reverse their rotative movement all together, but owing to the engagement of the pawl 21 with the teeth 10 of the sleeve 8, the latter is prevented from reverse rotation, but the stub shaft 2 and the ratchet wheel 12 will be rotated slightly reversely, whereupon the lateral extension 17 of the pawl 15 will take a bearing upon the teeth 11 of the sleeve, and raise the free end of the pawl from engagement with the teeth of the ratchet wheel, thereby releasing the ratchet wheel and the stub shaft, which will spin reversely with the stub of the old crank shaft of the car, without disturbance of the crank arm 13, thereby protecting the operator against injury.

The automatic release of the pawl 15 is almost instantaneous in the action of the parts, as stated.

We claim:

The combination with a motor car, of a safety crank for the shaft of the explosive engine thereof, consisting of a stub shaft having fast engagement with the end of the engine shaft, a sleeve rotatably mounted upon said stub shaft and having an inner series of ratchet teeth and an outer series of ratchet teeth, a ratchet wheel fast upon said stub shaft and having its teeth in line with and similar in number to said outer series of teeth, a crank arm rotatably engaging said stub shaft, a pivoted spring pressed pawl carried by said crank arm and engaging the said ratchet wheel and engaging also the said outer series of teeth, and a pawl pivoted to the radiator of the car and engaging said inner series of teeth, whereby in case of back fire, said first named pawl will be automatically released from said sleeve and said ratchet wheel to thereby release said crank arm.

ORIEN S. STRICKLAND.
GEORGE WILLIAM WOOD.